United States Patent
Pfluger

(10) Patent No.: US 11,644,285 B1
(45) Date of Patent: May 9, 2023

(54) ADAPTIVE BOOM-MOUNTED IR COUNTERMEASURE SYSTEM FOR ROTORCRAFT

(71) Applicant: Mark A. Pfluger, Pulaski, NY (US)

(72) Inventor: Mark A. Pfluger, Pulaski, NY (US)

( * ) Notice: Subject to any disclaimer, the term of this patent is extended or adjusted under 35 U.S.C. 154(b) by 27 days.

(21) Appl. No.: 17/557,220

(22) Filed: Dec. 21, 2021

(51) Int. Cl.
   *F41H 11/02* (2006.01)
   *F41J 2/02* (2006.01)
   *B64C 27/04* (2006.01)
   *B64D 3/02* (2006.01)

(52) U.S. Cl.
   CPC .............. *F41H 11/02* (2013.01); *B64C 27/04* (2013.01); *B64D 3/02* (2013.01); *F41J 2/02* (2013.01)

(58) Field of Classification Search
   CPC .. F41H 11/02; B64C 27/04; B64D 3/02; F41J 2/02
   USPC .......................................................... 89/1.11
   See application file for complete search history.

(56) References Cited

U.S. PATENT DOCUMENTS

| | | | | |
|---|---|---|---|---|
| 6,267,039 B1* | 7/2001 | Czarnecki | ................ | B64D 1/04 |
| | | | | 342/14 |
| 6,542,109 B2* | 4/2003 | Lloyd | ....................... | F41J 9/04 |
| | | | | 367/1 |
| 6,571,714 B1* | 6/2003 | Brum | .......................... | F41J 2/02 |
| | | | | 342/9 |
| 7,028,947 B2* | 4/2006 | Burns | ........................ | F41J 2/02 |
| | | | | 244/1 TD |
| 7,367,531 B2* | 5/2008 | Greene | .................... | B64D 7/00 |
| | | | | 89/1.11 |
| 7,523,692 B1* | 4/2009 | Burns | ........................ | F41J 9/10 |
| | | | | 342/14 |
| 7,938,052 B2* | 5/2011 | Childress | ............... | B64D 29/00 |
| | | | | 342/14 |
| 8,006,218 B2* | 8/2011 | Chuang | ................. | G06F 30/394 |
| | | | | 716/120 |
| 2005/0062638 A1* | 3/2005 | Zeineh | ..................... | G01S 3/786 |
| | | | | 342/9 |
| 2006/0065774 A1* | 3/2006 | Roques | ...................... | F41J 9/10 |
| | | | | 244/1 TD |

* cited by examiner

*Primary Examiner* — Samir Abdosh
(74) *Attorney, Agent, or Firm* — Bernhard P. Molldrem, Jr.

(57) ABSTRACT

An active countermeasure for military rotorcraft against a heat-seeking missile threat involves one or more telescoping booms or poles that are articulated at their proximal end to the fuselage of the rotorcraft and have an IR-radiating decoy mounted on their distal tip. When a missile launch is detected the missile flight path is computed and one or more of the booms are extended and swung out to place the decoy on the shot line of the missile. The decoy is then switched on and lures the missile away from the vulnerable components of the craft, such as the engine, rotors, and fuselage so as to cause a miss or failing that a detonation away from the rotorcraft. The countermeasures are stored compactly against or within the tail when not deployed.

5 Claims, 7 Drawing Sheets

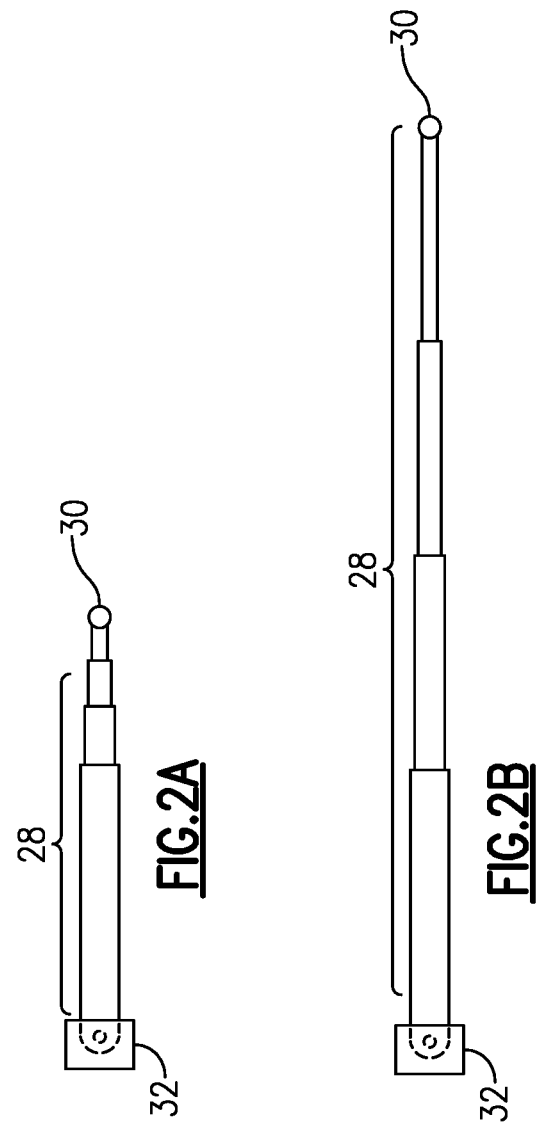

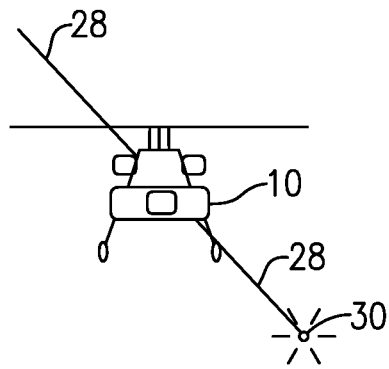
FIG.4C
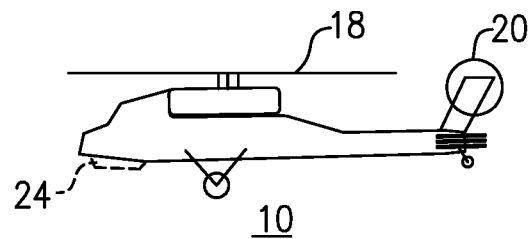
FIG.5
FIG.6

ADAPTIVE BOOM-MOUNTED IR COUNTERMEASURE SYSTEM FOR ROTORCRAFT

BACKGROUND OF THE INVENTION

The present invention concerns rotorcraft, i.e., rotary wing aircraft including helicopters, and is more particularly concerned with active countermeasures for such aircraft which can be deployed when a heat-seeking missile threat is detected, to divert the missile away from any of the targeted aircraft altogether, or at least to divert the missile away from the more vulnerable portions of the aircraft such as the main body, the main rotor, the tail rotor, or the engine exhaust, thereby inducing a miss or at least a sustainable hit.

Military rotorcraft, e.g., helicopters and other rotary wing aircraft, are at a particular risk from IR-guided missiles which may be utilized by terrorist groups and/or militaries e.g. potentially hostile military forces. These can be an enemy country's army, a rogue-government-backed militia, or a local guerilla force, any of which may have access to man-launched ground-to-air heat-seeking missiles. Countermeasures are typically provided for aircraft that are deployed in potentially hostile regions, so that if a missile threat is detected at or after launch, the missile threat can be diverted away from the aircraft. Traditional countermeasures usually take the form of expendibles, i.e., flares and jammers. These countermeasures are designed to cause the threat projectile to miss the target by providing a false target (or decoy) or by preventing a seeker from locking onto the target aircraft altogether. A serious limitation of flare-based countermeasure systems is the limited number of flares that can be carried. It is possible for expendable countermeasures supply to be exhausted or depleted, leaving the defending aircraft without protection in the midst of combat.

A preferred method of decoying IR-guided missiles is to use nonexpendable decoys that generate a miss by creating a false target that is a safe distance from the host aircraft. Existing commonly-used or proposed devices are unsuitable for rotorcraft because they need to be towed behind the aircraft on a tether. The tether is flexible and will not function well for rotorcraft, due to the risk of entanglement in a rotor or in ground obstacles, e.g., trees and powerlines, which may cause catastrophic loss of the entire aircraft.

SUMMARY OF THE INVENTION

To overcome the various problems of the previously-mentioned existing countermeasures systems, this invention employs a system of telescoping booms capable of being swung or adjusted in flight as necessary to position IR countermeasures clear of moving aircraft components as well as clear of ground obstacles.

The system comprises an adaptive array of infrared (IR) non-expendible countermeasures mounted on any of a number of telescoping maneuverable booms and designed to work with a missile launch detector and missile warning system.

The array can be retracted to lie alongside the fuselage of the aircraft, or stowed in a pocket in the fuselage. This reduces parasitic drag in high speed flight. The array is designed to cause a threat IR-guided projectile to miss critical aircraft components, such as the engine, fuselage, or rotor(s) by being decoyed and attracted to the IR source at the tip of one of the poles or booms of the array. The booms should be of sufficient extended length, and capable of being swung to a sufficient orientation when extended, to cause a miss along the shot-line or flight path of the projectile. There should be more than one boom, preferably three booms at least, to cover the lower, upper, and rearward areas of the aircraft. There can be as many booms as can reasonably be included, for a given aircraft's weight restrictions and enter of gravity limits.

The booms in the array can be extended, angled and the IR source or decoy illuminated to purposefully lure the IR-guided projectile away from the aircraft. This can be carried out in a pre-determined pattern or can be adjusted dynamically when the threat detector notifies the system of a missile launch. This may involve an integrated or collaborative missile warning system. Due to the nature of various IR-guided projectiles, which may have proximity fuses or graze sensors, there may be a miss in which the projectile warhead nevertheless detonates. For this reason, the individual booms are considered sacrificial, and designed to cause warhead detonation, when it happens, as far as possible from critical components of the aircraft (e.g., main rotor, engine).

In accordance with the principles of this invention, a rotary wing aircraft has a main body, a tail portion aft of the main body, and at least one main rotor driven by a heat-producing engine. A threat projectile detector (preferably on-board) detects a launch of a threat, such as a ground-launched heat-seeking missile.

A decoy countermeasure array is mounted on the rotorcraft and is deployable away from the body and rotor of the aircraft. This provides at least one false target away from the main body, tail portion, main rotor or other critical components. The decoy countermeasure arrangement may comprise at least one telescoping boom having a proximal end mounted on an articulated mount capable of swinging the at least on boom in one or more angular directions. Also the at least one boom is controllably extendible and retractable between a retracted and an extended state. Each such telescoping boom includes an IR-radiating decoy mounted on a distal tip thereof. A control arrangement in the rotorcraft receives an input from the threat projectile detector and has at least one control output coupled to the at least one telescoping boom and to its respective articulating mount. This is configured to swing and extend the at least one boom so as to position the IR-radiating decoy to cause the heat-seeking missile, when detected, to miss the main body and the main rotor. In a plural- or multiple-boom countermeasure arrangement, the several booms are positioned for an optimal defense of a given threat. In most cases there is a tail rotor mounted on the craft's tail portion, and the at least one boom and its respective IR-radiating decoy are directed optimally to cause the heat-seeking missile, when detected, to miss the tail rotor.

The decoy countermeasure arrangement comprises at least a first and second telescoping booms (and optimally a third boom), each having a respective IR-radiating decoy mounted at its distal end, and each having a proximal end mounted on a respective articulated mount, situated on left and right sides, respectively of said tail portion, or left, right and under sides.

Favorably, in a multiple boom arrangement, each such telescoping boom includes a plurality of tubes configured to slide within one another to extend and retract the boom between its retracted and extended states. Of course, other boom arrangements, including articulated booms, may be employed for a given rotorcraft. To protect the aft portion of the craft, the control arrangement may be configured to position the distal end of one of said at least one boom downward and out to one side of the tail portion when a threat is detected.

These and other features and advantages of the countermeasure arrangement of this invention will become apparent from the description and explanation of the preferred embodiment(s) as described in reference to the accompanying Drawing figures.

BRIEF DESCRIPTION OF THE DRAWING

FIGS. 2A and 2B are illustrations of a telescoping boom as employed in embodiments of this invention in the withdrawn position and in the extended position, respectively.

FIGS. 4A, 4B and 4C are side, top and front views respectively of the rotorcraft having the countermeasure telescoping booms extended and having one IR radiator decoy thereon radiating.

FIGS. 5, 6, 7 and 8 are side views of the rotorcraft illustrating progressively, a hostile missile launch detected; countermeasure booms being extended outward while an appropriate one of the IR decoys is being selected for activation; the selected one of the booms and decoys being swung into a position further from the fuselage and other critical structures; and the hostile missile being led away from the rotorcraft fuselage and critical structures, i.e., causing a miss or alternatively a detonation at a safe distance.

DETAILED DESCRIPTION OF THE PREFERRED EMBODIMENT

Figure 1A:
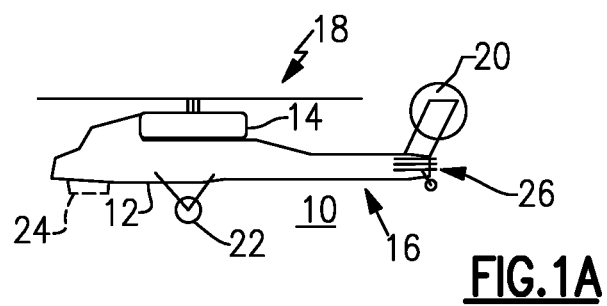
FIGS. 1A and 1B are side elevation and top plan views respectively, of one example of rotorcraft having countermeasures (in a stowed configuration) according to an embodiment of this invention.
Figure 1B:
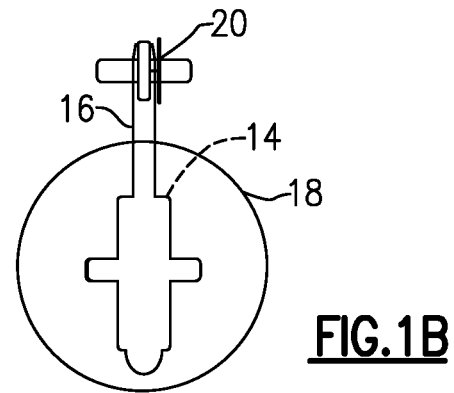

With reference to the Drawing, and initially to FIGS. 1A and 1B, a battle helicopter 10 is offered as an example of a rotary wing military aircraft, or rotorcraft. Here the helicopter 10 has a main body or fuselage 12, with one or more turbine engines 14, and with a tail portion 16 extending aft of the main body fuselage 12. The engine or engines 14 provide motive power to at least a main rotor 18 and to a tail rotor 20 that is mounted on the tail portion. The main rotor 18 provides lift as well as forward motion and directional control. The usual landing gear 22 are visible beneath the main body fusilage. Here, a missile warning system 24 (shown in broken line) may be present at the lower portion of the main body, with a sight angle oriented downward. The missile warning system is designed to recognize the heat and speed signature of a man-launched anti-air missile. These units can detect a launch and predict the flight path of the missile so that appropriate evasive action or countermeasures can be employed.

A countermeasure array 26 of boom-mounted non-expendible decoy countermeasures are positioned compactly on the rotorcraft 10, in this case along the tail portion 16. Each of the booms or poles in the array is extendible and retractable, as will be discussed, and has at its distal tip an infrared (IR) radiating decoy, which is intended to mimic the heat signature of the aircraft's engine(s) 14, and to lure the heat-seeking missile threat away from any vulnerable and critical structures on the rotor craft.

As shown in FIGS. 2A and 2B and subsequent views, the countermeasure array 26 may comprise at least one, and favorably three telescoping booms 28, which are normally kept in a retracted state and positioned or stowed against the tail portion where they do not interfere with the navigation or speed of the helicopter. In this case there is one boom 28 on the right or starboard side of the tail, one on the port or left side, and one on the lower portion of the tail. Here as illustrated in FIG. 2A one of the booms 28 is shown in its collapsed or withdrawn state. FIG. 2B shows the boom in its extended state. The boom 28 in this embodiment may be formed of a number of tubes, one inside the next, and arranged to slide in or out relative to the other tubes. These can be electrically or hydraulically actuated. The distal tip of the boom 28 supports an IR-radiating beacon 30 which may be turned on in response to a threat detection by the missile warning system 24, and the proximal end (at the left) is positioned in a rotatable mount 32, which provides two rotational degrees of motion. The mount 32 is supported on the fuselage or tail and is controllably driven to swing (and extend) the one or more booms 28 in response to detection of a missile threat. An articulated boom that unfolds to an extended state and folds to a compact state could be employed in some embodiments.

Figure 3A:
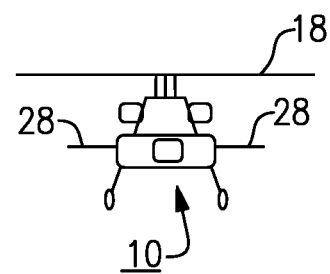
FIGS. 3A and 3B are front and side views of the rotorcraft with the countermeasures deployed, i.e. extended.
Figure 3B:
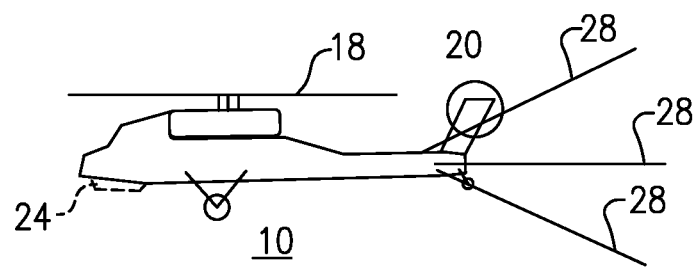
Figure 4A:
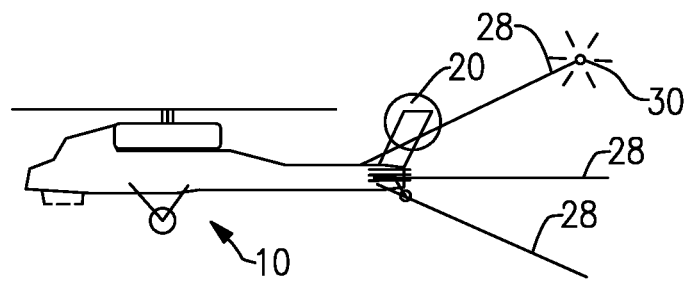
Figure 4B:
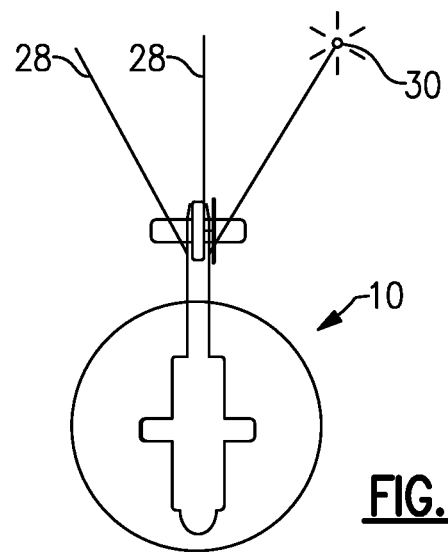

FIGS. 3A and 3B show the battle helicopter 10 with the booms 28 in their extended state, and swung out somewhat away from the axis of the craft. FIGS. 4A, 4B and 4C similarly illustrate the countermeasure array on the battle helicopter 10, but with one of the IR radiators or decoys 30 turned on and radiating. Depending on the speed and calculated flight path of the missile threat, this illuminated IR decoy may be above the helicopter 10 (FIG. 4A,) to one side (FIG. 4B) or beneath the helicopter (FIG. 4C).

The operation commencing with initial detection of a hostile missile launch can be explained with reference to FIGS. 5 to 8.

Figure 7:
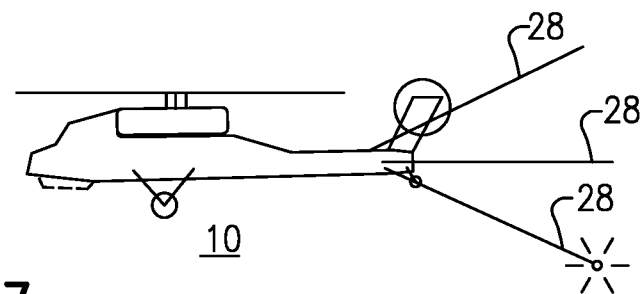
Figure 8:
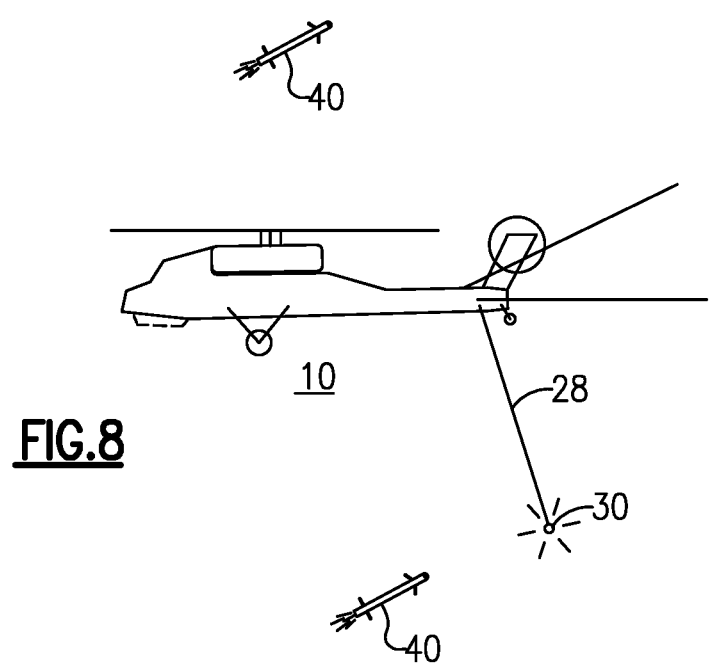

Initially, at the time a hostile missile 40 is launched and directed toward the helicopter 10, the countermeasure array 26 is stowed and in its withdrawn condition, with the compacted telescoping booms 28 lying against the sides of the tail, or concealed within the tail. Once the missile warning system 24 detects this missile 40 it calculates a flight path for the missile 40 and commences a countermeasure operation, extending the booms 28 and swinging them out away from the axis of the attack helicopter, as shown in FIG. 6. Then one of the booms is selected as the decoy and is swung into a position farther from the fuselage and critical aircraft structures, and its decoy IR beacon 30 is turned on, as shown in FIG. 7. This places the IR radiating decoy 30 at a safe distance from the main fuselage and other critical structures, as shown in FIG. 8, causing a miss, or failing that causing the missile to detonate at a safe distance from the aircraft. When the threat is ended the booms 28 return to their compacted state and are stowed against the side of the tail so as not to interfere with flying operations.

Figure 9:
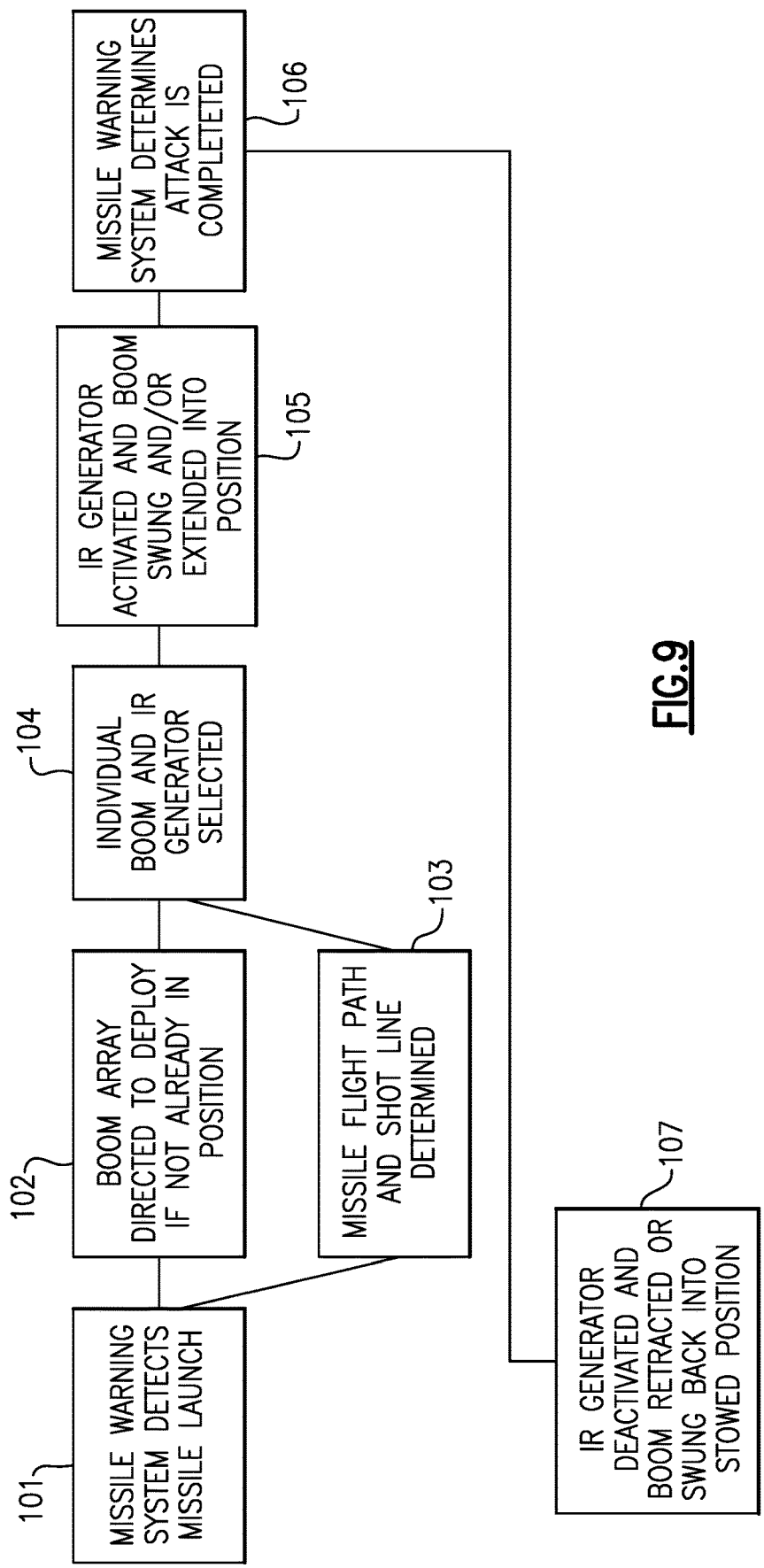
FIG. 9 is a block diagram explaining the deployment of the countermeasures arrangement in response to detection of a hostile missile threat.

The interaction of the missile warning system with the countermeasures array 26 can be explained with the block diagram of FIG. 9.

During a normal flight operation, the missile warning system 24 is active and is looking for missile threats. Any missile launch is considered a threat, and it is presumed that the missile is heat-seeing and is designed to pick up and lock onto the IR radiation of the engine exhaust. In the event there is a missile threat detected (block 101), the boom array 26 is directed to deploy, if not already in position (block 102).

At the same time, the missile warning system 24 calculates the missile flight path and determines the missile's shot line (block 103). Based on the flight path and shot line data, an individual boom and its respective IR generator or decoy is selected (block 104). Then the IR generator decoy is activated, and the boom is extended and swung into proper position to re-direct the hostile missile (block 105). When the missile flies past the countermeasure, or else detonates at a safe distance, an attack-completed state is initiated (block 106), and this causes the IR generating decoy 30 to be de-activated, and then the boom(s) are retracted and swung back to their stowed positions. These operations can be repeated each time a missile threat is detected.

The countermeasure system can be configured for a lower speed threat, e.g., a drone attack, without any major changes, where such a threat may be expected.

The principles of this invention are not to be confined to the specific embodiment disclosed here. Rather many modifications and variations are possible without departing from the scope and spirit of this invention, as defined in the appended claims.

What is claimed is:

1. A rotary wing aircraft having a main body, a tail portion aft of the main body, at least a main rotor driven by a heat-producing engine said rotary wing aircraft having a threat projectile detector thereon adapted for detecting a launch of a ground-launched heat-seeking missile;
   a decoy countermeasure arrangement mounted on said rotary wing aircraft and deployable away from the main body and said at least one main rotor of said aircraft for providing a false target away from said main body, said tail portion, and said at least one main rotor;
   the decoy countermeasure arrangement comprising at least one telescoping boom having a proximal end mounted on an articulated mount capable of swinging the at least one boom in one or more angular directions, and the at least one boom being controllably extendible and retractable between a retracted and an extended state; each said telescoping boom including an IR-radiating decoy mounted on a distal end thereof; and
   a control arrangement receiving an input from said threat projectile detector and having at least one control output coupled to said at least one telescoping boom and to its respective articulating mount, and configured to swing and extend said at least one telescoping boom so as to position the IR-radiating decoy to cause the heat-seeking missile, when detected, to miss said main body and said at least one main rotor.

2. The rotary wing aircraft of claim 1 further comprising a tail rotor mounted on said tail portion, and wherein said control arrangement is operative to direct the at least one telescoping boom and its respective IR-radiating decoy to cause the heat-seeking missile, when detected, to miss said tail rotor.

3. The rotary wing aircraft of claim 1 wherein said decoy countermeasure arrangement comprises at least a first and second telescoping booms, each having a respective IR-radiating decoy mounted at distal end thereof, and each having a proximal end mounted on a respective articulated mount, situated on left and right sides, respectively of s aid tail portion.

4. The rotary wing aircraft of claim 1 wherein each of said at least one telescoping boom includes a plurality of tubes configured to slide within one another to extend and retract the boom between its retracted and extended states.

5. The rotary wing aircraft of claim 1 wherein sail control arrangement is configured to position the distal end of said at least one telescoping boom downward and out to one side of the tail portion when a threat is detected.

* * * * *